Jan. 6, 1953     O. J. PORTER     2,624,251
APPARATUS FOR EARTH COMPACTION
Filed Oct. 3, 1947     6 Sheets-Sheet 1
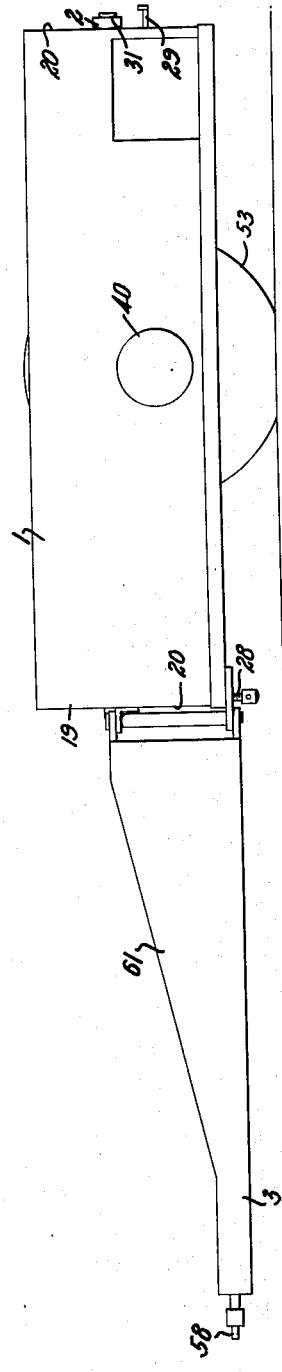
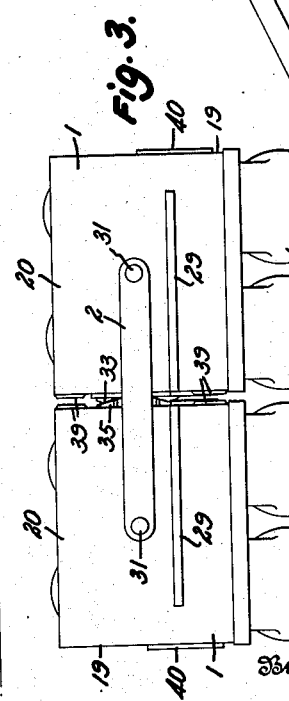
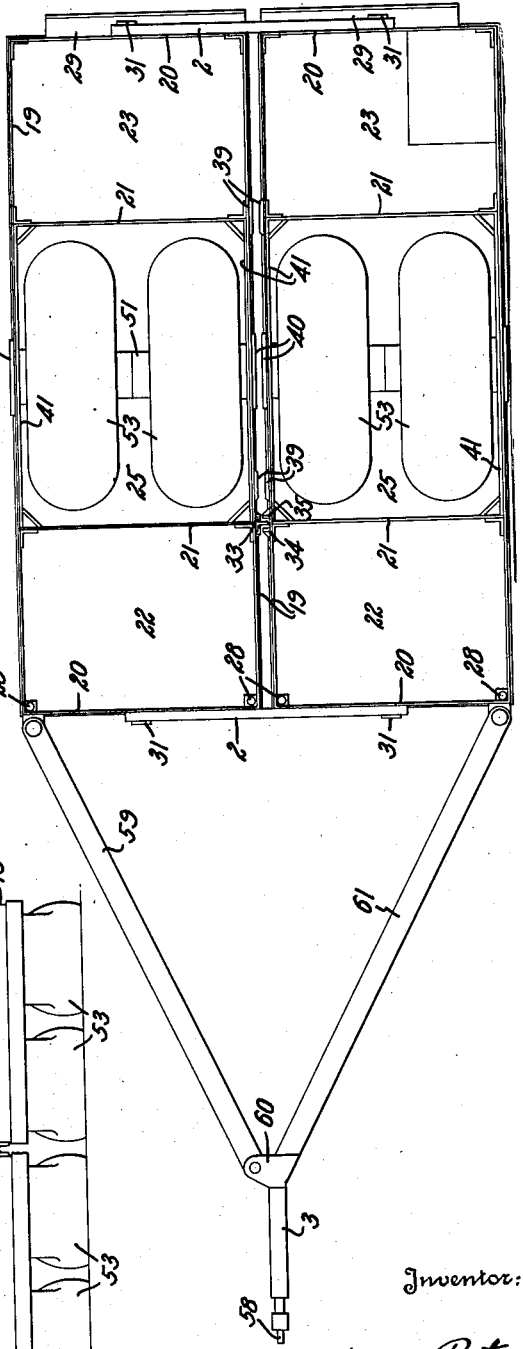

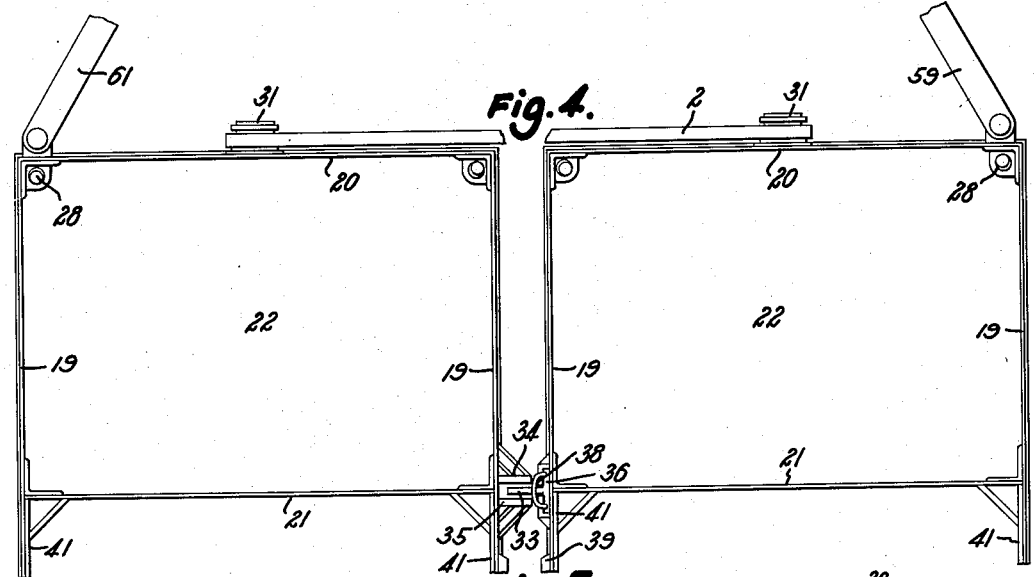
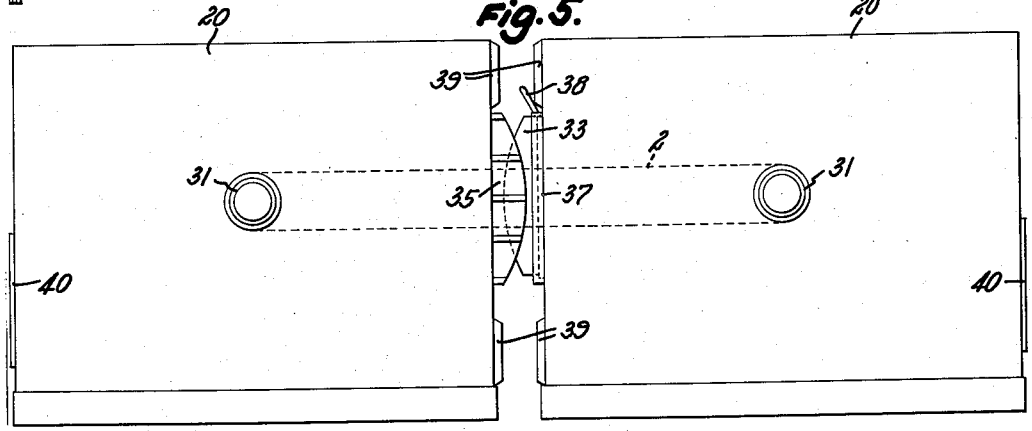
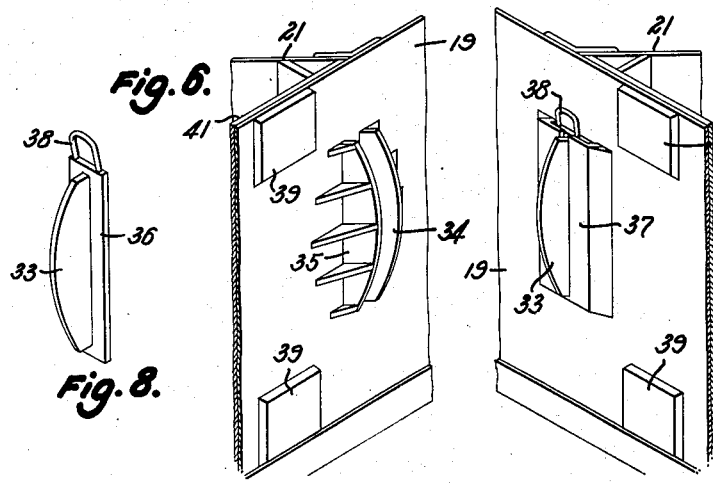

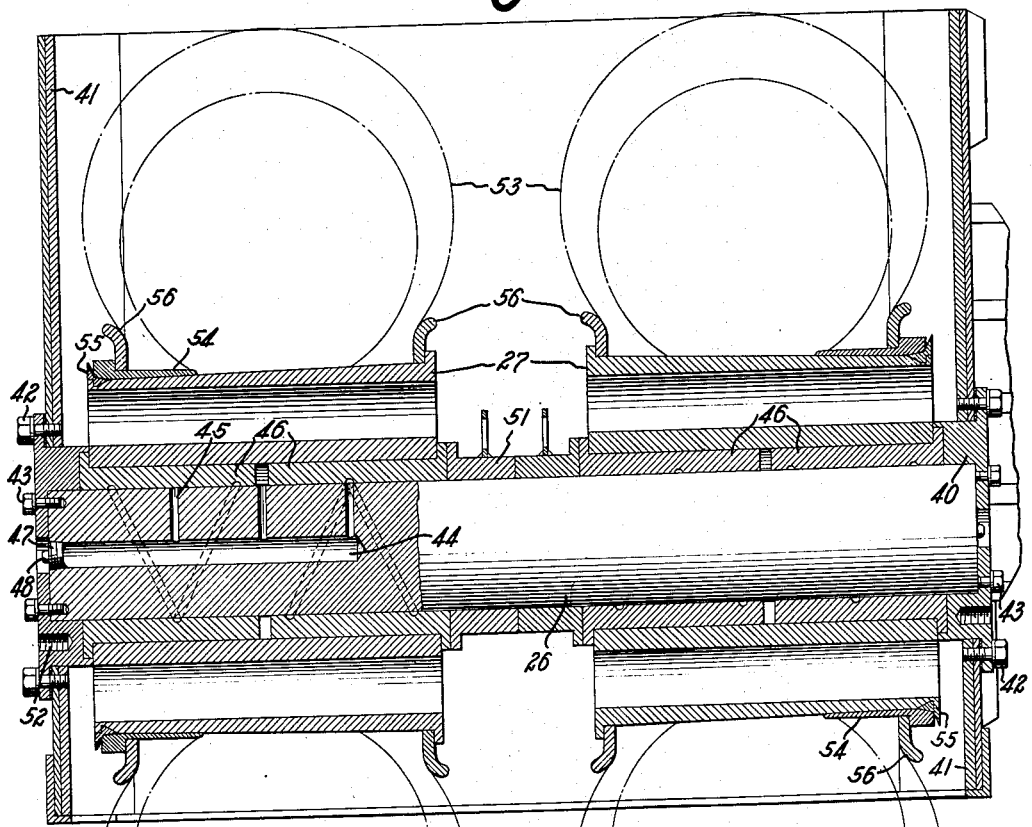
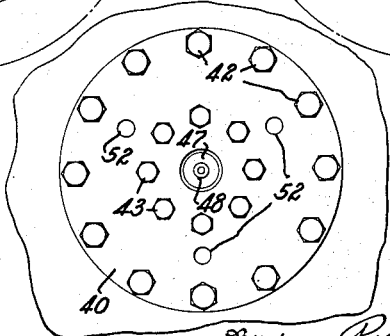

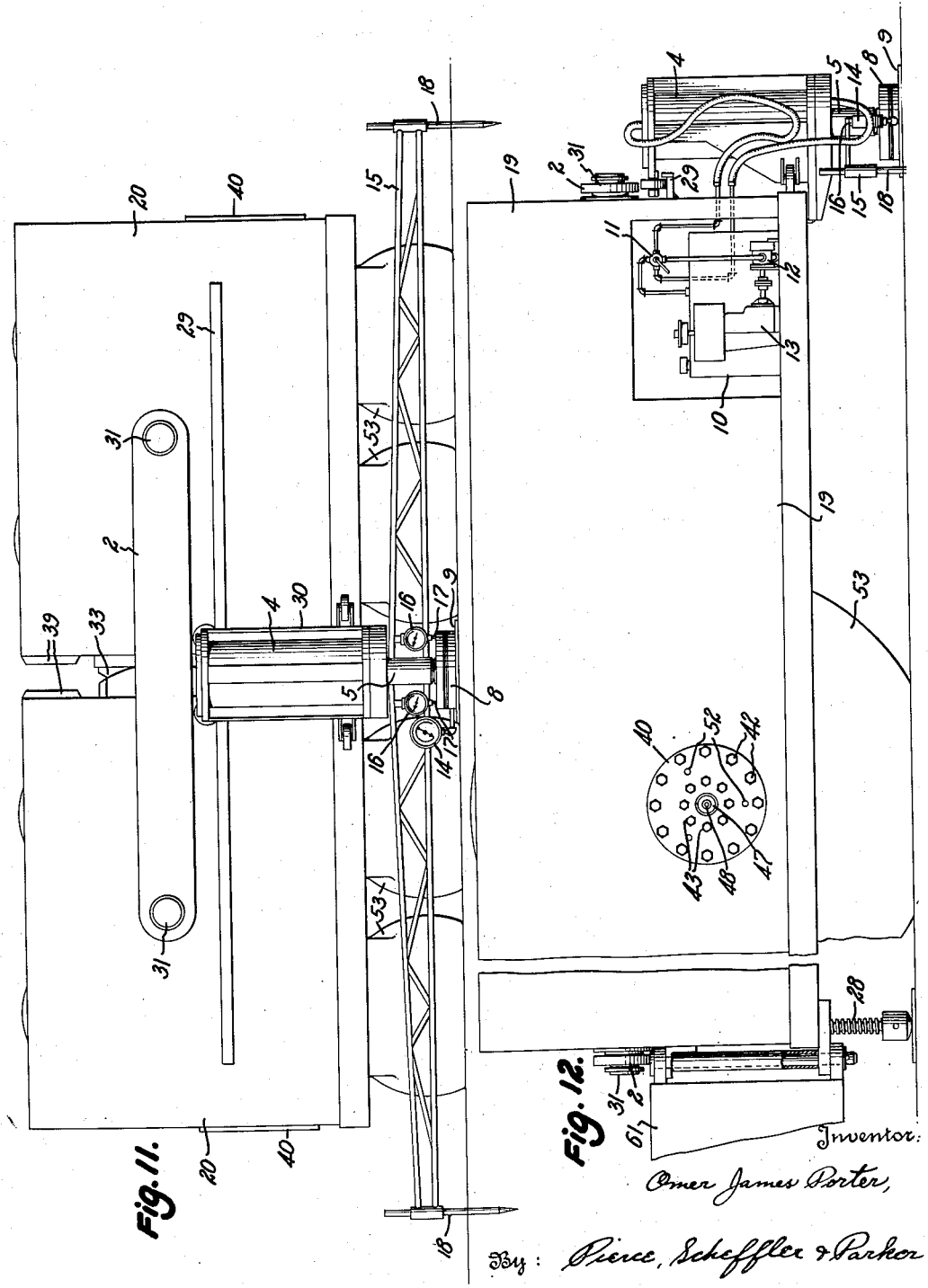

Jan. 6, 1953
O. J. PORTER
2,624,251
APPARATUS FOR EARTH COMPACTION
Filed Oct. 3, 1947
6 Sheets-Sheet 5
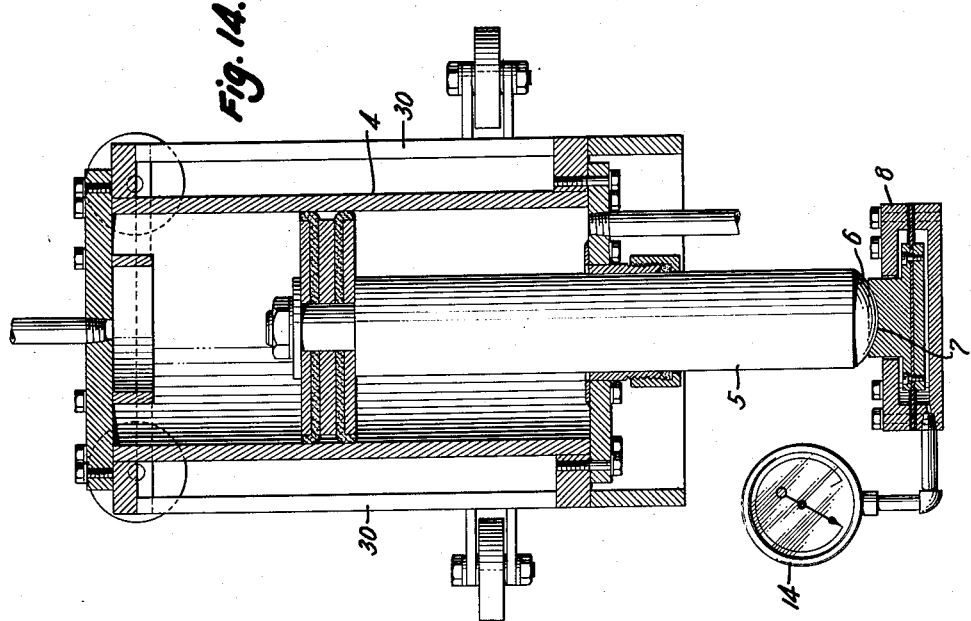
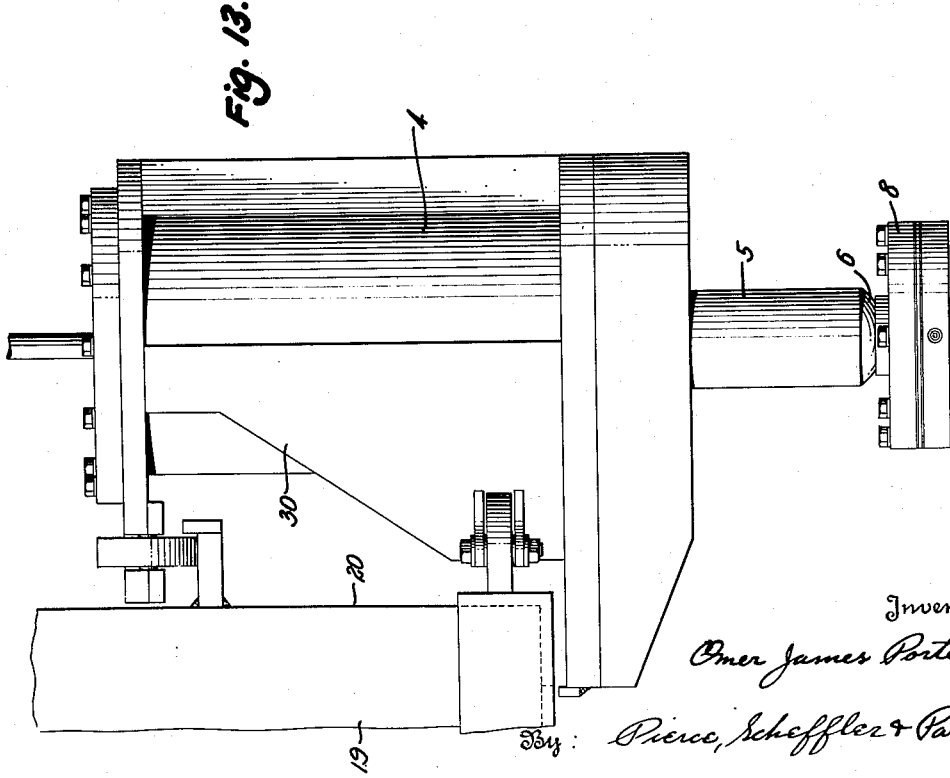
Inventor:
Omer James Porter,
By: Pierce, Scheffler & Parker,
Attorneys.

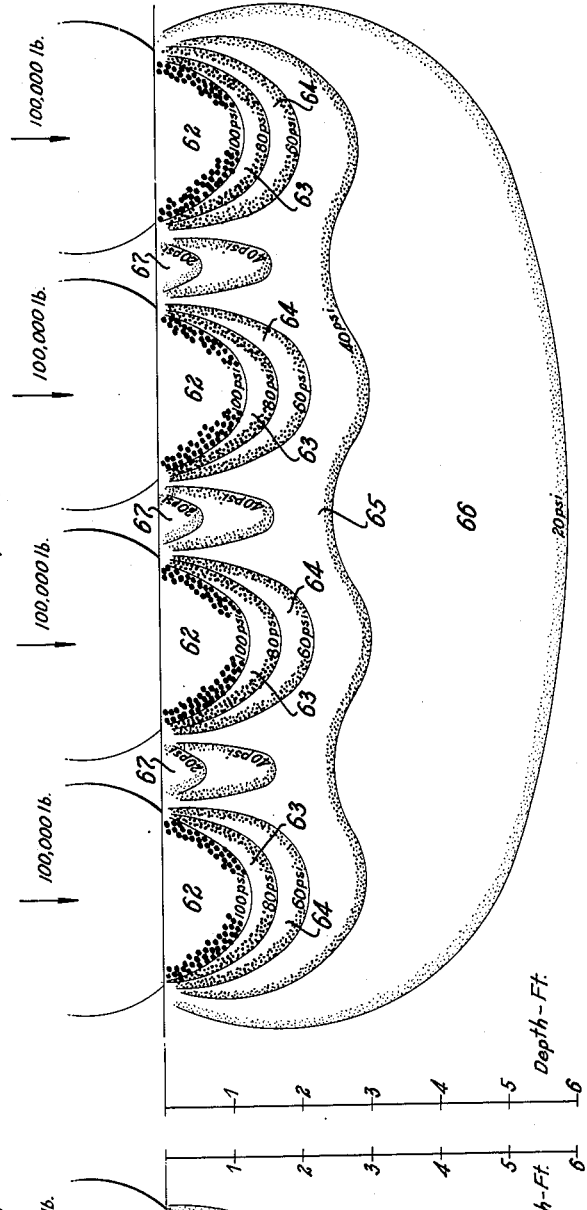
Fig. 15. Porter Heavy Compaction Roller
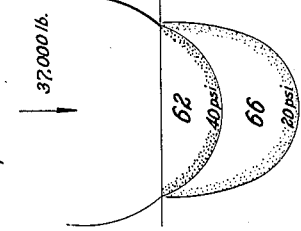
Fig. 16. Heavy Earth Mover Patented Jan. 6, 1953

2,624,251

UNITED STATES PATENT OFFICE 2,624,251

APPARATUS FOR EARTH COMPACTION

Omer James Porter, Sacramento, Calif.

Application October 3, 1947, Serial No. 777,763

7 Claims. (Cl. 94—50)

The present invention relates to a method and apparatus for compacting earth subgrades, subbases and bases for airfields, highways and the like. More particularly, the invention is concerned with improved means and methods of earth compaction employing heavy multiwheeled high pressure pneumatic-tired ballast-carrying rollers provided with integrated testing equipment.

Experience with the performance of airports under traffic with extremely heavy airplanes has indicated that when the airports are constructed with the usual equipment now available for compacting the subgrades and base courses, considerable detrimental settlement of the pavement surface occurs. This settlement is of sufficient magnitude to often require expensive resurfacing and other repairs to airport pavements. The density of the subgrades and base courses which have been observed after traffic with heavy airplanes is considerably in excess of the density which is usually specified for construction work. Naturally when this increase in density of the underlying soil takes place after construction there is a corresponding settlement of the pavement surface. Prevention of this settlement can only be accomplished by obtaining very high density of subgrade and base course during construction, so that little or no further densification and settlement will occur after the airfield has been placed in service.

It has further been observed that the increase in density which causes settlement of the pavement surface occurs to a considerable depth. This means that an increase of density during construction over a considerable depth is required, and that, in the upper portion particularly, it is necessary to obtain an increase of density greatly in excess of that usually now specified for construction work based on what is now considered to be standard compaction equipment.

Where it is now required to increase the density for a considerable depth, it is customary to excavate the material to be densified and to replace it, in thin layers, compacting each layer as the replacement is made. This process is an extremely expensive one.

In recent years, rollers provided with pneumatic tires carrying ordinary air pressures have come into favor as preferred devices for compacting soil in cases where sheepsfoot rollers and flat steel rollers were formerly used. However, the invention is based upon the finding that compacting equipment of the type described of very great weight, such as for example gross weights up to and exceeding 200 tons, employing large high pressure tires is capable of producing vastly superior results.

By utilizing mass loading of high intensity, such as that which can be obtained with the heavy compaction roller of the invention, deep densification with extremely high densification near the surface can be obtained, which will eliminate, to a large extent, the necessity for excavation and refill in thin layers. This roller will also, where traffic with heavy wheel load can be expected, produce densities of the same order of magnitude and at similar depths to those which would be produced under the heavy wheel load traffic. Thus by use of the method and apparatus of the invention during construction, detrimental pavement settlement and costly repairs to pavement can also be avoided.

The principle involved in utilizing mass loading and high pressure intensity, involves distributon of pressures beneath the roller. A study of stress distribution beneath loaded areas has not previously been applied to the design of compaction rollers.

With use of heavy earth moving equipment or other previously employed compaction rollers, which are now often used for obtaining what is usually considered a high degree of compaction, not only is the pressure intensity less throughout the stress pattern, but it also extends only to a very shallow depth.

While some of the principles of the invention find practical usefulness when employed with smaller and lighter mechanisms, according to the method of the invention compaction is accomplished by repeated passes over the earth being processed with very heavy ballast-carrying, multiwheeled high pressure pneumatic tired roller units towed by suitable vehicles or prime movers. Rollers having unprecedented gross weights of a range much higher than heretofore anticipated have exhibited the ability to produce foundation soils having 3 to 10 times the strength obtained by previous rolling methods.

Use of the method and apparatus of the invention renders it possible merely by rolling to obtain a foundation compaction exceeding the required specifications for heavy duty airfields and highways in cases where it would otherwise be necessary to import and spread rock and gravel or other costly foundation material in order to provide a subgrade or base of the required density and strength. Thus the invention, depending upon the nature of the subsoil either eliminates the necessity of importing large amounts of rock or gravel or other foundation material or greatly reduces the amount required to meet a given condition.

By rolling with weights capable of producing stresses equal to and exceeding those of the traffic to be borne, sub-grade failures can be observed under the rolling load and corrective measures taken before the pavement is applied. Furthermore, employment of weights of this caliber under proper conditions of soil moisture results in reduction of construction costs by reducing the number of roller trips required to compact the soil to a given density, if the weight be applied through large high pressure pneumatic rubber tires.

Increase in the density of soil under the action of a roller is caused by a combination of shear and normal stresses which cause the particles of soil to move closer together, reducing the void space between grains. High densification to a relatively great depth can be achieved under either dry or moist subgrade conditions with the large high pressure pneumatic tired roller of the invention, whereas the shallow effective depth of a small roller carrying low pressure tires would require excavation and replacement of the soil layer by layer in order to obtain equivalent compaction to an equivalent depth. The preferred method of the invention utilizes high intensity and large mass loading to produce a base of high density and extremely high stability.

However, any process utilizing roller compaction equipment must be carried on in such a manner that the shear stress is not sufficient to cause the subgrade material to fail completely, since under such a condition of stress the soil yields and remolds without appreciable densification.

The method of the invention enables the user to capture all of the hereinbefore described advantages of an extremely heavy high pressure rubber tired roller while at the same time obtaining a nicely executed compaction to the desired predetermined extent. That is to say, the apparatus of the invention is designed to effect in one instrument the means both for (a) producing the compaction and (b) determining the degree of compaction by contemporaneous determination of subgrade reaction to static loads. Therefore, even where soft subgrade conditions are encountered, the equipment of the invention is ideally suited for compaction of foundation soils and any additional base materials required.

The method comprises compacting the initial layers of base course material by reducing ballast and thus the gross weight of the roller sufficiently to avoid shear displacement of the underlying soil. As construction of the subgrade and base course progresses, the load and pressure intensity is increased and the final compacted density is obtained for a considerable depth of the base course without overstressing the subgrade.

Maximum efficiency in the performance of these operations requires a continual supply of data concerning changes in the subgrade density as operations proceed. In other words, it is necessary to proper and efficient execution of this method of compaction that it be known exactly when to increase the gross load of the roller and by precisely how much. The determination of shear strength is the function of testing means which, according to the invention, is integrated with the compacting means.

When the roller has made an adequate number of passes to arrive at a suitable compaction with respect to the gross weight of the equipment, the testing unit is employed to determine soil density and thus the correct amount of ballast to be added in order to approach, but not exceed, the shear strength of the particular soil during the subsequent run or set of passes. The procedure is repeated until the required depth and degree of density is obtained.

Practice of the invention produces very high density in the subgrade and also to considerable depth in the underlying foundation where the soils are of a pervious nature. By pre-consolidating and pre-testing the base and subgrade, weak areas in the pavement foundation are detected and corrected prior to paving operations, thus avoiding expensive repairs or reconstruction and in many cases making it feasible to resort to less expensive surfaces. Final testing of the strength and density of the completed subgrade provides the necessary data for determination of the required thickness of pavement.

The apparatus of the invention is illustrated in the accompanying drawings in which:

Figure 1 is a side elevation of a roller assembly comprising a portion of the invention, Figure 2 is a plan view of a roller assembly comprising two articulated units, Figure 3 is a rear view of the assembly shown in Figure 2, Figure 4 is a plan view of a portion of the assembly of Figure 2, showing the means for limiting the longitudinal play between adjacent units, Figure 5 is a rear elevation in part, showing the means for limiting the longitudinal play between adjacent units, Figure 6 is a perspective of the side wall portion of a unit mounting the play limiting means, Figure 7 is a perspective of the side wall portion of a unit mounting the play limiting means adapted to cooperate with the play limiting means shown in Fig. 6, Figure 8 is a perspective of a portion of the play limiting means shown in Fig. 7, Figure 9 is a section through an axle and wheel assembly of one of the units of the invention, Figure 10 is a side elevation of an axle mounting assembly, Figure 11 is an elevation of the rear of a roller assembly complete with its supported and associated testing equipment in position for testing.

Figure 12 is a side elevation thereof,

Figure 13 is a side elevation on an enlarged scale of a portion of the hydraulic testing equipment mounted on the rear of a roller assembly, Figure 14 is a vertical axial section through the testing equipment shown in Fig. 13 with some of the parts appearing in elevation, Fig. 15 is a graphic illustration of the pattern of stress distribution in subgrade underlying the wheels of a loaded roller assembly, and Figure 16 is a graphic illustration of the pattern of stress distribution underlying a wheel of a conventional compacting roller.

Referring to the drawings, it will be seen from Figs. 1–3 that the roller embodying the invention consists of two or more articulated units or load boxes 1 joined by tie bars 2 and adapted by means of a tongue assembly 3 to be drawn by a crawler type tractor (not shown) or other suitable prime mover.

Mounted on the rear of the roller (Figs. 11 and 12) is a hydraulic jack 4, the piston member 5 of which has its lower terminus 6 (Figs. 13 and 14) adapted for association with seat 7 of a hydraulic pressure capsule or weighing cell 8 which may rest on a test plate 9 of desired size when it is placed in operative position.

The hydraulic jack is connected for operation by an actuating assembly comprising a fluid tank 10, four-way valve 11, and pump 12 powered by a motor 13 carried in one of the load boxes. The hydraulic pressure capsule is equipped with a pressure gauge 14. A bridge member 15 is provided as a stationary means for determining deflection of the pressure capsule or test plate. Deflection gauges 16 carried by the bridge member are adapted to have the lower ends of their vertically reciprocal stems 17 bear upon the upper surface of the pressure capsule when the bridge is positioned for testing. The bridge is supported by means of its anchor points 18 which are driven into the ground outside of the zone of influence of the unit.

Each load box has a body frame comprising side plates 19, end sections 20, and cross members 21 mounted between the side plates so as to form three compartments, the front 22 and rear 23 compartments being provided with flooring and the center compartment 25 being bottomless to house an axle 26 and wheels 27. The front and rear compartments serve to carry ballast.

Screw jacks 28 are fastened within each of the front corners of the front compartment and a horizontal slide or trackway 29 secured on the back of the rear compartment serves to mount the hydraulic jack 4. The hydraulic jack is adapted to be moved to any position along the trackway, and when joined load units are brought into proper alignment, the jack may be easily moved from the trackway of one load unit to the trackway of the other, since jack mounting assembly 30 is designed to bridge the gap between the adjacent ends of the trackway.

The tie bars 2, one of which is located at each end of the load units when the roller is assembled, are mounted on trunnion assemblies 31 which allow the units to oscillate independent of each other in vertical planes and which are adapted for easy removal and replacement of the tie bar. When the jack is to be used from a location midway of the sides of the roller, the units are trued up and held in a rigid unitary condition by the positioning of suitable locking means such as wedges between the lower edges of the adjacent boxes, the rigidity of the assembly being the total effect of the tie bars and the wedges.

The units of an assembled roller are held in parallel longitudinal control by an anchoring device (Figs. 6 and 7) which comprises three interdigitated thrust plates mounted with their long axes pointed vertically on the outer surface of the inboard sides of the load units but extending out from the sides. Single thrust plate 33 mounted on one unit is disposed between the spaced plates 34 and 35 of the other unit, the spacing being sufficient to give adequate anchoring and control while yet allowing ample play between units for turning and rolling uneven ground.

The plate 33 is mounted on a backing strip 36 (Fig. 8), giving the assembly the form of a "T-iron" which may be slipped into retainer 37 by means of handle 38. This arrangement permits adjacent positioning of the units prior to insertion of the thrust plate 33.

The arcuate shape of the outer edges of the thrust plates allows for any normal rolling motion of the individual load units, and bumper pads 39 serve to take the shock of contact between units, preventing wear on the side plates. If desired, edgewise contact of the thrust plates of one unit with the side plate of the adjoining unit may be obviated by increasing the thickness of the bumper pads.

Axle housings 40 are supported in openings in the side plates 19 of the load units, reinforcing plates 41 being employed along the sides of the center compartment to assist in taking the weight. The axle along with its mounting assembly is a feature of the invention in that it is adapted for ease of removal for wheel changing, tire repairs, etc. It has the additional important function of serving as a structural member of the load unit to increase the strength and rigidity of the individual unit.

The axle proper is of a length equal to the distance between the outside surfaces of the side plates of the load unit, and since the spacing and arrangement of axle and wheel parts is the same on each side of the center line of the load unit, only half of the axle and wheel assembly has been shown. However, the axle and wheel details are illustrated in Figs. 9 and 10 in which the axle proper 26 is shown as supported in the housing 40, which is positioned in the opening through the side plate 19 and reinforcement plate 41, the axle housing being secured to the plates by the housing retaining bolts 42.

Axle retaining bolts 43 hold the axle 26 in position in the housing, and in operation, the wheels 27 turn on the axle which remains stationary. An axial bore 44 extends in from the end of the axle and channels 45 branching from it serve as grease conduits to provide for proper lubrication of the wheel bushings 46. The outer end of the bore is equipped with a pipe plug 47 into which is mounted a grease fitting 48.

The wheels are held in position by the axle housing on one side and a center spacer 51 on the opposite side which separates the two wheels 27 of the load unit, but thrust washers may be inserted adjacent the wheel on each side. Drilled into the axle housing 40 are holes 52 which are adapted to receive eye bolts or pullers.

In order to remove a wheel, it is only necessary to jack up the load box, disengage the axle retaining bolts in the axle housing at one end of the axle, remove the housing retaining bolts from the opposite end, and employ the eye bolts for pulling out the axle from the second end. The wheels are then free to be lifted out through the top of the center compartment. The screw jacks and the hydraulic jack are used for jacking up the unit when changing the tires.

The wheels are especially designed for long life, efficient operation under the enormous loads which they must bear, and easy disassembly for removal of the pneumatic rubber tires. Details of wheel structure are illustrated in Fig. 9 in which 46 is the split or double bushing mounting the wheel proper 27. Roller bearings which are fixed in the wheels and turn with them on the axle may be substituted for the bushing if desired. A tire 53 is secured on each wheel by means of a bead seat band 54 held in position by a lock ring 55. One of the side flanges 56 may be provided with a driving lug (not shown).

The character of the pneumatic rubber tires is of importance to efficient employment of the apparatus, and although tire size is determined in accordance with the size and weight of the particular roller on which the tire is to be employed, all rollers require high-pressure tires of a special high strength design.

For the lighter equipment (80 ton rollers), size 21 by 29, 32-ply rating nylon tires carrying 100–120 lbs. per square inch air pressure and having a load bearing capacity of approximately 40,000 lbs. per tire are desirable. Thus at a full load of 40,000 lbs. at an inflation pressure of 100 lbs./sq. in., each tire develops a large contact area of 300 or more square inches. On the other hand, the heavy equipment (200 plus ton rollers) should be provided with size 30 by 33, 60-ply rating nylon tires carrying 120–150 lbs. per square inch and having an accredited manufacturers' capacity rating of 100,000 lbs. at that pressure. At capacity load and 150 lbs. inflation pressure this tire develops a contact area of 600 or more square inches. An intermediate sized roller of 150 tons is suitably equipped with size 30 by 33, 40-ply rating nylon tires with a rated capacity of 75,000 lbs. each at an operating pressure of 100 to 120 lbs. per square inch. At capacity load and 100 lbs. inflation pressure this tire develops a contact area of 700 or more square inches.

It should be noted that regardless of roller size, the apparatus of the invention is invariably supplied with tires of high air pressure since it is so constructed that with heavy loaded high-pressure pneumatic tires it exerts a high compactive effort on the soil when drawn over it. The pressures employed range from 2 to 3 times higher than those employed on standard earth moving equipment, and in conjunction with mass loading provide the load intensity required to achieve improved compaction.

For operation, the tongue assembly 3 of the joined load units is attached to the draw bar (not shown) of the towing vehicle by means of the standard hitch 58, the right hand tongue member 59 being coupled with the link 60 mounted on the left hand member 61.

In compacting subgrades and the like, the first passes with the roller are ordinarily carried out with the ballast compartments either empty or filled to an extent determined by prior knowledge of the soil and subgrade conditions.

When preliminary coverage of the area with the roller is deemed sufficient to have produced a desired soil density for that particular roller gross weight, testing and subsequent addition of ballast is carried out and followed by a second run or set of passes with the roller at the new increased weight. It is obvious that existing conditions will dictate whether one or more passages of the roller over the entire subgrade are required at each gross weight load of the roller. Likewise, it may sometimes be feasible to accomplish testing only after a number of load increases have been made rather than before each load increase.

It is of importance that the loading of ballast ordinarily be equally divided between the four ballast carrying compartments in order to maintain proper balance of the roller and insure maximum loading of the weight on the roller wheels and to produce the desired pattern of stress distribution in the subgrade.

The high degree of, and great effective depth of compaction produced by the invention appear to be the total result of the two factors (a) mass loading and (b) high intensity of loading. These factors, in turn, are supplied by the employment of great weight applied to the subgrade through coaxially positioned closely spaced pneumatic tires carrying air under extremely high pressure.

Figure 15 is a graphic illustration of the pattern of the distribution of stresses in soils under compaction according to the invention. It is of course obvious that extreme compaction results in the zones 62 which are immediately adjacent the surface beneath the tires, and that the zones 63, 64 and 65 disposed vertically below the zones 62, would also be subject to high but increasingly lesser degrees of pressure. A similar effect is illustrated in Figure 16, which is a pattern of the stresses produced by conventional equipment, although surface compaction is not as great nor does the compaction reach to a comparable depth.

As is apparent from Figs. 2 and 3, the spacing between the contact areas of adjacent tires when under load is appreciably less than the width of the tires, being not more than about one half the width of the tire in the illustrated embodiment as measured at the ground line, and, as is clear from Fig. 15, this spacing which should be a minimum is limited only by the minimum clearance between the side walls of adjacent tires necessary to maintain for free running. Because of this close spacing between all tires the soil deep in the subgrade is confined throughout the entire area between and underlying the outermost tires of the roller apparatus and hence upward thrust of the soil between adjacent tires is prevented as the soil is put under heavy load. This feature thus permits a very heavy loading per unit of tire contact area and large contact area per tire which results in an interlaced web of stresses which blend together to produce what may be termed a high order of "area compaction" at great depth for the entire distance between the two outermost tires.

Thus the zone 66 is a homogeneously compacted area extending to an unexpected depth of the order of 5 to 6 feet. The small uncompacted surface blind spots 67 are readily removed by a second pass of the equipment over the area, which pass will also serve to deepen and broaden zones 62, 63, 64 and 65 and to some extent the zone 66.

By comparison of the lateral extension of the zones of compaction in Figs. 15 and 16, it will be observed that prior methods of rolling cannot result in the continuous areas of densification at great depth achieved by the invention.

When a test of subgrade conditions is to be made, the screw jacks on the front corners of the load boxes are screwed down to level and steady the roller during test and take the front end weight when the rear end is elevated by the hydraulic jack. Then the hydraulic jack mounted on the rear is used to raise and apply the roller weight to the grade through the test plate, the bridge member having first been properly positioned.

The bridge member is placed so that the stems of its deflection gauges are plumb and bear on opposite edges of the upper surface of the test plate. The bridge is held immobile by its adjustable anchor points which are driven into the earth. Therefore, any vertical movement of the test plate can be measured relative to the stationary bridge by means of the indicators on the gauges, and in the event of uneven deflection of the test plate or pressure capsule, the mean reading of the gauges will give an accurate value for deflection of the plate.

The operation of the jack actuating assembly may, if desired, be conducted to apply the load to the test plate at a controlled rate in order to determine the strength and load-deflection characteristics of foundation or subgrade as stabilized by the previous rolling. Simultaneous readings of the pressure and deflection gauges give the information necessary for determination of the density and shear strength of the subgrade, for determination of optimum roller gross weight for rolling and for determination of the strength of the completed subgrade to determine the thickness of pavement required.

Since the hydraulic jack can be shifted from one unit to the other by rolling along the track which is mounted on the rear of each unit and since the jack can be placed in the middle of the two units on the track by wedging and locking the two units together, it follows that the weight from either unit or from both units together can be applied to the test plate. Further, the small contact area of the test plate relative to the contact area of the tires insures that the test equipment is capable of producing much greater pressures than those exerted by the roller prior to the test.

It should be noted that the test unit is mounted at a distance from the tires which for normal purposes is greater than the zone of influence of the tires on the grade. The minimum safe distances has been determined as 8 to 10 feet for most operations, and in this connection it is requisite to accurate readings of soil deflection under load that the gauge carrying bridge have its anchor support points 18 laterally offset farther than the zone of influence of the test plate.

Throughout the specification and claims, the term "subgrade" is intended to include sub-bases, bases, and the like and any soil or earth grade or base which may require artificial compaction. It is also desired to point out that the method and apparatus of the invention find utility in the compaction of fill material in cases where it is necessary to apply successive layers of fill and to compact each layer prior to application of a subsequent layer.

I claim:

1. Earth compacting apparatus comprising a plurality of articulated units, each unit being mounted on a plurality of closely spaced wheels carried by an axle supported substantially midway of the length of said unit, a tongue member secured to the front end of each of said units, a pivotally mounted tie bar closely connecting the front ends of each pair of adjacent units so that the axles of said adjacent units are substantially in longitudinal alignment, a pivotally mounted tie bar closely connecting the rear ends of each pair of adjacent units, horizontal trackways mounted across corresponding ends of said units, a testing assembly mounted for lateral movement along one of the trackways, and means including said tie bars for rigidly locking adjacent units from relative movement when the adjacent ends of adjacent trackways are in longitudinal alignment.

2. In a roller compactor consisting of a plurality of articulated units, a horizontal trackway mounted on corresponding ends of said units, the trackways of adjacent units being in horizontal alignment when said adjacent units are on a level surface, a soil testing jack mounted on one of said trackways and adapted to be moved to any position along said trackway, means for rigidly locking said adjacent units when the trackways of said adjacent units are in horizontal alignment, and a mounting means for said testing jack capable of bridging the gap between the adjacent ends of adjacent trackways whereby said testing jack may be positioned midway between adjacent units and moved from one unit to the other.

3. Earth compacting apparatus comprising an assembly of two articulated wheeled load units adapted to be towed, jacking means mounted on one end of said assembly capable of taking the weight of said one end of said assembly, a second jacking means capable of taking the weight of the opposite end of said assembly, movable mounting means securing said second jacking means to said assembly, locking means connecting said load units at said opposite end of said assembly to prevent relative motion between said load units, means indicating ground loading pressures exerted by said second jacking means, and means associated with said second jacking means adapted to indicate deflection of a ground engaging test plate associated with said second jacking means.

4. Apparatus for compacting subgrade comprising a body member adapted to carry ballast, an axle mounted transversely of and substantially at the longitudinal center of gravity of said body member, a plurality of wheels mounted on said axle, a pneumatic rubber tire mounted on each of said wheels, a tongue member secured to one end of said body member, jacking means mounted on one end of said body member and adapted to take the weight of said end of said apparatus, a second jacking means capable of taking the weight of the opposite end of said apparatus, movable means mounting said second jacking means on the opposite end of said body member for displacement transversely of said member, a test plate depending from the lower terminus of said jacking means, said test plate being adapted to bear on said subgrade and said second jacking means being adapted to transfer varying portions of the weight of said apparatus from said wheels to said subgrade via said test plate, indicating means carried by said test plate adapted to indicate the amount of pressure applied to said test plate, and indicating means bearing on said test plate for indicating the degree of vertical movement of said test plate.

5. Means for the longitudinal parallel control of two adjacent individual units of an articulated assembly of an earth compaction roller apparatus comprising at least two spaced apart plates mounted on the exterior surface of the inboard side of one of said units, each of said plates extending vertically, the major surface areas of said plates lying in parallel planes perpendicular to the plane of said side, at least one plate substantially parallel to and positioned between and vertically guided by said first mentioned plates mounted on the exterior of the inboard side of the unit adjacent the first mentioned unit and tie bars pivotally interconnecting the front ends and the rear ends of said units, respectively in fixed spaced relation.

6. Earth compacting apparatus comprising at least two roller load units arranged side by side, a pivoted tie bar connecting the front ends of said units in fixed spaced relation, a second pivoted tie bar connecting the rear ends of said units in fixed spaced relation and vertically extending thrust plates mounted on said units, the thrust plates of said units being interdigitated and slidable longitudinally of one another thereby to relieve said tie bars of any strains applied other than to the longitudinal axes of said tie bars.

7. Apparatus for compacting soil comprising a pair of roller units arranged in closely spaced parallel relation with their respective load axles arranged in substantially longitudinal alignment, each said unit comprising a body providing a ballast compartment constituted by spaced side and end walls, a plurality of wheels arranged along the entire length of each axle, each wheel mounting a pneumatic tire having a continuous rolling engagement with the surface being compacted and having a maximum allowable pressure of at least one hundred pounds per square inch and high load capacity, all of said tires being closely spaced thus effecting a confinement of the soil deep in the sub-surface throughout the entire area underlying the outermost tires of said apparatus and the establishment of an interlaced web of high unit area stresses productive of a high degree of compaction throughout said deep sub-surface area, and means maintaining said units in fixed spaced relation comprising tie bars extending between the end walls of said units and pivotally connected thereto at each end of each bar intermediate the side walls thereby providing for free oscillation of each unit independently of the other in vertical planes when compacting uneven ground.

OMER JAMES PORTER.

REFERENCES CITED

The following references are of record in the file of this patent:

UNITED STATES PATENTS

| Number | Name | Date |
|---|---|---|
| 1,993,103 | La Barre | Mar. 5, 1935 |
| 2,024,184 | Ritchie | Dec. 17, 1935 |
| 2,245,865 | Le Tourneau | June 17, 1941 |
| 2,261,933 | Flynn | Nov. 11, 1941 |
| 2,266,924 | Tway | Dec. 23, 1941 |
| 2,382,986 | Ganley | Aug. 21, 1945 |
| 2,397,296 | Scribner | Mar. 26, 1946 |
| 2,411,836 | Sechel | Nov. 26, 1946 |

FOREIGN PATENTS

| Number | Country | Date |
|---|---|---|
| 770,245 | France | June 25, 1934 |
| 321,524 | Great Britain | Nov. 14, 1929 |

OTHER REFERENCES

Bateman: Highway Engineering, third edition, 1939, pp. 19, 20, 21, 34.

Principles of Highway Construction by Public Roads, June 1943, page 257.